(No Model.)
D. MAYER.
STEAM COOKER.
No. 599,512. Patented Feb. 22, 1898.
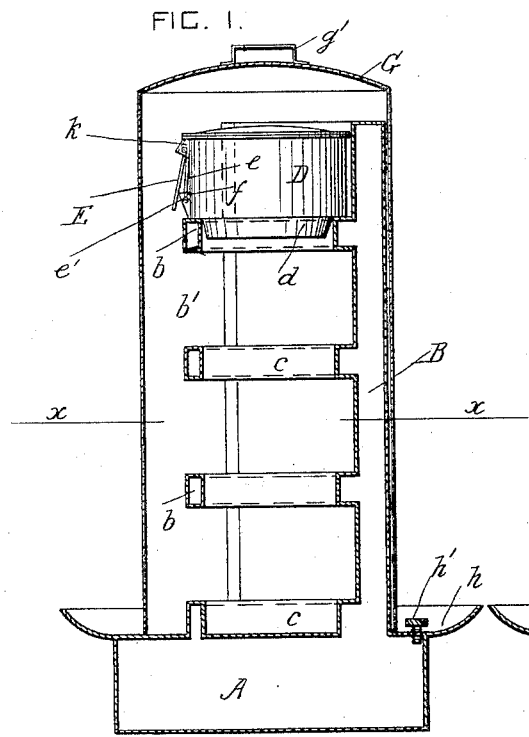
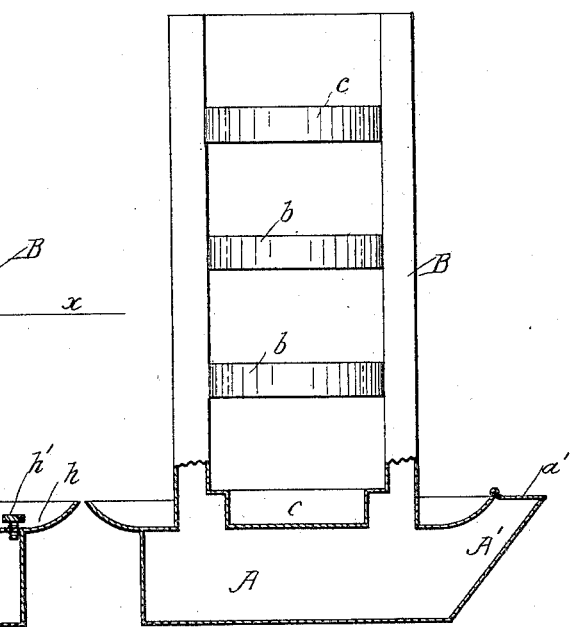
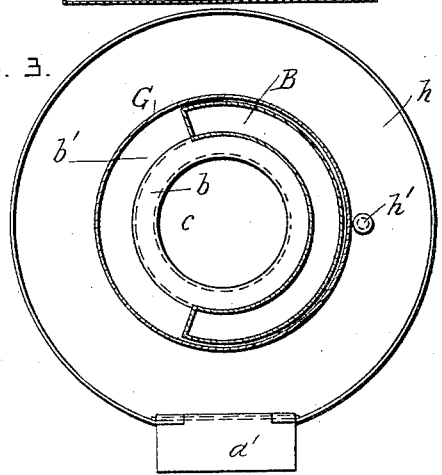
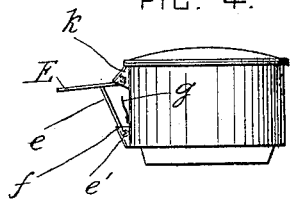
WITNESSES
INVENTOR
Daniel Mayer
by Herbert W. Jenner.
Attorney

UNITED STATES PATENT OFFICE.

DANIEL MAYER, OF MANCOS, COLORADO, ASSIGNOR OF ONE-HALF TO WILLIAM ROESSLER, OF SAME PLACE.

STEAM-COOKER.

SPECIFICATION forming part of Letters Patent No. 599,512, dated February 22, 1898.

Application filed May 29, 1897. Serial No. 638,739. (No model.)

*To all whom it may concern:*

Be it known that I, DANIEL MAYER, a citizen of the United States, residing at Mancos, in the county of Montezuma and State of Colorado, have invented certain new and useful Improvements in Steam-Cookers; and I do hereby declare the following to be a full, clear, and exact description of the invention, such as will enable others skilled in the art to which it appertains to make and use the same.

This invention relates to steam-cookers; and it consists in the novel construction and combination of the parts hereinafter fully described and claimed.

In the drawings, Figure 1 is a vertical section through the cooker. Fig. 2 is a front view, partly in section, with the cover removed. Fig. 3 is a cross-section taken on the line $x\,x$ in Fig. 1. Fig. 4 is a side view of one of the cooking utensils, showing its handle in its raised position.

A is a hollow base portion adapted to contain water, and A' is a spout, provided with a lid $a'$, through which water may be poured into the base.

B is a hollow upright communicating with the base A and formed of a portion of a hollow cylinder, which is divided into a series of compartments by hollow shelves $b$, arranged one above the other. The compartments of the upright are open at the front, and the hollow shelves $b$ are circular and project through the opening $b'$ at the side of the upright. The upper portion of each shelf $b$ and the upper plate of the base are provided with a circular recess or aperture $c$ for holding the cooking utensil in a central position.

D is a cooking utensil or saucepan, provided at its bottom with a projection $d$ for fitting into the recess $c$ when placed on one of the hollow shelves of the upright. Compartments for four saucepans are shown, but a larger number can be provided for by making the cooker higher.

Each saucepan is provided with a handle E, hinged to its upper edge. A support $e$ is pivoted on a pin $e'$, passing through a pocket $f$ on the lower part of the saucepan below the handle. When the handle is depressed, the support $e$ lies close against the saucepan; but when the handle E is raised to a horizontal position and bears against a stop $k$, projecting from the saucepan, the top portion of the support drops away from the side of the saucepan, or it may be pressed away from it by a spring $g$, so that the handle is held in a horizontal position.

G is a cover, consisting of a cylinder closed at the top and provided with a handle $g'$. When the handles of all the saucepans are pressed down, the cover can be slid over the upright. Any steam which is condensed in the cover falls into the concave top plate $h$ of the base and may be let back into the base, if desired, by removing a plug $h'$.

The cooker is placed on a stove or over a fire, and the steam ascends in the hollow upright and fills the hollow shelves, so that the saucepans are heated and are surrounded by hot vapor, which is kept in contact with them by the cylindrical cover.

What I claim is—

1. In a steam-cooker, the combination, with a base portion for holding water, of a single hollow upright formed of a portion of a cylinder, open on one side and having a central space and supports for cooking utensils within the said central space, the internal steam-spaces of the said upright and base being in communication with each other, and a cylindrical cover slidable vertically over the said upright and resting on the said base, substantially as set forth.

2. In a steam-cooker, the combination, with a base portion for holding water, of a hollow upright formed of a portion of a cylinder, open at one side and having a central space, hollow shelves secured to the inner side wall of the said upright and provided with recesses for the cooking utensils, the internal steam-spaces of the said base, upright, and shelves, being in communication with each other, and a cylindrical cover slidable vertically over the said upright and supported by the said base, substantially as set forth.

3. The combination, with a cooking utensil provided with a projecting stop, of a foldable handle hinged to the utensil under the stop, and a support for the handle pivoted to the lower part of the said utensil and
5 moving away from the side of the utensil when the said handle is raised, substantially as set forth.

In testimony whereof I affix my signature in presence of two witnesses.

DANIEL MAYER.

Witnesses:
FRANK SERRIER,
J. J. MOREFIELD.